No. 718,682. PATENTED JAN. 20, 1903.
M. F. WENRICH.
NUT LOCK.
APPLICATION FILED OCT. 21, 1902.
NO MODEL.
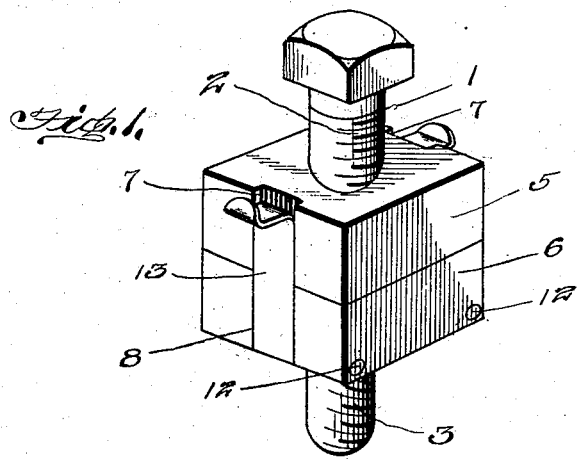
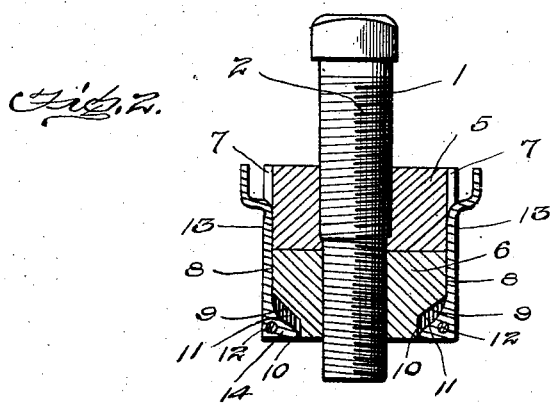
Witnesses
Jas. A. G. Koehl.
Inventor
M. F. Wenrich
By H. B. Willson & Co.
Attorneys

UNITED STATES PATENT OFFICE.

MICHAEL F. WENRICH, OF RAVINE, PENNSYLVANIA.

NUT-LOCK.

SPECIFICATION forming part of Letters Patent No. 718,682, dated January 20, 1903.

Application filed October 21, 1902. Serial No. 128,142. (No model.)

*To all whom it may concern:*

Be it known that I, MICHAEL F. WENRICH, a citizen of the United States, residing at Ravine, in the county of Schuylkill and State of Pennsylvania, have invented certain new and useful Improvements in Nut-Locks; and I do declare the following to be a full, clear, and exact description of the invention, such as will enable others skilled in the art to which it appertains to make and use the same.

The invention relates to nut-locks.

The object of the invention is to provide a nut-lock which shall be simple of construction, durable in use, comparatively inexpensive of production, and by means of which the bolt will be securely locked to the nut against the accidental displacement of one from the other.

In the accompanying drawings, Figure 1 is a perspective view of my improved nut-lock. Fig. 2 is a longitudinal sectional view.

In the drawings, 1 denotes a bolt a portion of which is of reduced diameter.

2 denotes the right-hand threads, formed upon that portion of the bolt of the greater diameter, and 3 denotes the left-hand threads, formed on that portion of the bolt of the lesser diameter.

5 denotes a nut to engage the right-hand threads, and 6 denotes a nut to engage the left-hand threads. The nut 5 is preferably provided with seats or recesses 7, and the nut 6 is provided with similar recesses 8, the base-walls of which terminate at their forward ends in forwardly-inclined surfaces 9, which in turn terminate in straight bases 10, thus forming chambers 11, across which extend pivots 12 to receive levers 13. Each lever 13 is provided with a toe 14, which in the act of depressing the levers into the recesses 8 engage the base 10 as said toes swing in the arc of a circle and frictionally bind against the base 10, and when the levers have been swung sufficiently far to allow them to rest in the recesses formed in the nuts the toes of the levers will lie flush with the top of the nut. It will thus be seen that the two nuts are connected, and as it is necessary in order to remove said nuts to rotate them in opposite directions it will be impossible to so rotate both nuts at the same time, and thus a perfect nut-lock is provided, one in which it will be impossible for the nuts to accidentally work loose. Should it be desired for any cause to remove the nuts, this may be accomplished by swinging the levers to an open position. In doing this the toe will encounter the same frictional obstruction, which is sufficiently great to prevent the levers accidentally swinging to an open position, but which will permit the levers being swung entirely open if sufficient force is applied to their free ends.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim, and desire to secure by Letters Patent, is—

A nut-lock, comprising a bolt of unequal diameters reversely threaded, nuts having bores of unequal diameters and reversely threaded, one nut being provided with a recess, the base-wall of which terminates in an inclined portion, and then terminates in a horizontal base to form a chamber, a pivot-pin extending across said chamber, and a lever provided with a beveled toe pivoted to said pivot and adapted, when closed, to engage both of said nuts and prevent them from turning, the toe of said lever in swinging in an arc of a circle being adapted to engage the said horizontal base of the recess.

In testimony whereof I have hereunto set my hand in presence of two subscribing witnesses.

MICHAEL F. WENRICH.

Witnesses:
JOHN BATDORF,
CHAS. TALLMAN.